US006292271B1

United States Patent
Phan

(10) Patent No.: US 6,292,271 B1
(45) Date of Patent: Sep. 18, 2001

(54) SOFT LABELS FOR MFP PANEL DISPLAY

(75) Inventor: Tom Phan, Irvine, CA (US)

(73) Assignees: Toshiba American Information Systems, Inc., CA (US); Kabushiki Kaisha Toshiba, Kanagawa-Ken (JP)

( * ) Notice: Subject to any disclaimer, the term of this patent is extended or adjusted under 35 U.S.C. 154(b) by 0 days.

(21) Appl. No.: 09/146,550

(22) Filed: Sep. 3, 1998

(51) Int. Cl.$^7$ ........................................ H04N 1/00
(52) U.S. Cl. ........................ 358/440; 358/400; 358/402; 358/1.15
(58) Field of Search .................. 379/93.08, 355, 379/368, 356, 96; 358/402, 440, 1.15, 400; 395/166; 382/209; 341/23; 364/900; 399/8; 345/354, 146, 173

(56) References Cited

U.S. PATENT DOCUMENTS

| | | | | |
|---|---|---|---|---|
| 4,385,366 | * | 5/1983 | Housey, Jr. ........................ | 364/900 |
| 4,908,853 | * | 3/1990 | Matsumoto ........................ | 379/355 |
| 5,199,063 | * | 3/1993 | Erickson et al. ................... | 379/100 |
| 5,291,305 | * | 3/1994 | Sakashita et al. .................. | 358/444 |
| 5,459,579 | * | 10/1995 | Hu et al. ........................... | 358/296 |
| 5,459,776 | * | 10/1995 | Di Santo et al. ................... | 379/96 |
| 5,513,126 | * | 4/1996 | Harkins et al. .................... | 364/514 |
| 5,539,530 | * | 7/1996 | Reifman et al. ................... | 358/402 |
| 5,781,619 | * | 7/1998 | Kong ................................ | 379/100.14 |
| 5,835,089 | * | 11/1998 | Skarbo et al. ..................... | 345/335 |
| 5,903,733 | * | 5/1999 | Hong ................................ | 395/200.62 |
| 5,930,350 | * | 7/1999 | Johnson ............................. | 379/355 |
| 5,935,250 | * | 8/1999 | Shimizu ............................ | 713/201 |
| 5,937,150 | * | 8/1999 | Phan ................................. | 395/114 |
| 5,950,193 | * | 9/1999 | Kulkarni ........................... | 707/3 |
| 6,049,597 | * | 4/2000 | Satake et al. ..................... | 379/93.08 |
| 6,108,492 | * | 8/2000 | Miyachi ........................... | 395/114 |
| 6,134,017 | * | 10/2000 | Schlank et al. ................... | 358/1.15 |
| 6,137,599 | * | 10/2000 | Mullin ............................. | 358/442 |

* cited by examiner

Primary Examiner—Edward Coles
Assistant Examiner—Tia A Carter
(74) Attorney, Agent, or Firm—Arter & Hadden LLP

(57) ABSTRACT

In a machine having facsimile capabilities, a method for programming soft speed buttons which includes determining whether a number is associated with a given speed button; and if a number is associated with that speed button, providing for a facsimile message to be transmitted to the associated phone number. However, if no number is associated with the given speed button, then allowing a user to create a label for that speed button, and also to associate a number with that speed button.

13 Claims, 10 Drawing Sheets

SOFT LABELS FOR MFP PANEL DISPLAY

RELATED APPLICATION INFORMATION

This application relates to patent application Ser. No. 09/016,454 entitled "Work Group Address Book" and patent application Ser. No. 08/797,962 entitled "LCD Panel Controlled by Two Process Elements," which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates to the user interface of a facsimile machine.

2. Description of Related Art

The workplace of yesterday consisted of at least two groups of employees with different functions. One group produced content, such as that of letters, presentation material and legal material. The other group, working at individual stations such as desks and simple electronic equipment, processed the content into finished material such as letters, slides and legal documents, transmitted the material to its intended destination, duplicated it for archival purposes, etc. In the modern workplace, however, electronic devices have become increasingly more necessary and ubiquitous. Typically, computers are provided at secretarial workstations, rest on managerial desks, and are carried along by field representatives.

Typically, also, these computers are networked together to share resources such as printers and file servers. In the new generation of office equipment, devices such as facsimile machines and copiers, which were once considered stand alone machines, are now being networked as well.

More recently, peripheral devices have become available which are able to perform a number of related functions, such as copying, printing, faxing and scanning. These devices are known as multifunction peripherals (MFPs).

The Telecommunication Industry Association (TIA) has provided an MFP interface standard known as the IS-650 Multifunction Peripheral Industry Interface Standard, Level 1 (MFPI-1) specification version 5.5. According to this standard, an MFP is:

Computer equipment used to scan, print, facsimile transmit, and/or copy documents. It also may have the capability to provide data modem and other voice telephony services. The MFP may be an integrated unit or may be several discrete units that are interconnected on the same communication channel to the Host or interconnected using several different channels. One or more of the subsystems may be omitted from the MFP.

A "Host" as defined in MFPI-1 is any terminal or computer capable of providing commands and data to operate a peripheral, and in practice is a computer of any size, or a group of network nodes on a given local area network. As used herein, a "host" is a generic Host, providing the quality of functionality specified in MFPI-1 without necessarily adhering to the specification. A "subsystem" according to MPFI-1 is one of several logical peripheral units, such as printer, scanner, fax-data-voice (FDV) modem, internal memory, stand-alone controller (SAC), operator console and others which may exist in the MFP or Host. The Host and the MFP communicate through a "channel."

An MFP can operate in stand-alone mode, wherein two or more subsystems are used without interaction with the Host. One example of this is copying. Stand-alone operations may occur at the same time that the Host is accessing a different subsystem for a Host-controlled operation.

For a user interface (UI), the MFP includes an alphanumeric display, typically an LCD, and a user input means, such as panel buttons. The panel buttons will generally include some specialized speed dial buttons that enable a user to transmit material to one or more frequently called numbers without having to enter the individual digits. The user may read various information from the display, and may utilize the user input means for controlling the operation of the multifunction peripheral. The multifunction peripheral includes a controller, such as a microprocessor and ROM, which store user interface programs and cause the display to display status and control information. In both printing and copying, the display is typically used to show information about the status of the copy or print job. In these typical systems, all of the UI controls are stored in and controlled by the multifunction peripheral.

However, as more functions and features are included in an MFP, its user interface generally becomes more complex. Under modern office conditions, users may also access these functions from remote locations. Thus, where a user wishing to transmit a document both by fax and mail might have printed the document on bond paper, copied the printed letter in a copy machine, and run the copy together with an added pre-created cover sheet through a facsimile machine, the same user may now electronically assemble both document and cover sheet electronically and transmit both electronically via facsimile from his or her own desk. Or, in the alterative, the user may wish to perform one of more of these functions while at the facsimile machine.

Inevitably, as the number of users of such a system increase, there arises a tendency for certain types of problems, errors and inefficiencies to occur. Thus, for example, as the number of users increases so does the number of frequent facsimile recipients. Where it has been commonplace to provide a dozen or so 'speed dial' buttons for frequently used numbers, that amount becomes grossly inadequate. Furthermore, maintaining those speed dial buttons as hard keys becomes a task that is both difficult and served as a source of errors.

Traditional hard key buttons are programmed conveniently at the console, but identification of the buttons is performed by inserting slips of paper under a transparent panel associated with the keys in the appropriate positions. Problems that can arise under this situation include putting the label in the wrong position, preparing labels of incorrect dimensions, and writing the label ambiguously (e.g., IRV may mean a company to one person, the name of a man to a second, and an Irvine, Calif. location to a third).

Furthermore, when a phone number associated with a given button changes, users may find it difficult to determine whether or not the number had been properly changed. Deletion of obsolete numbers may also be sufficiently bothersome that it will not be done in a timely fashion or, in fact, until there are no more free buttons. At that time the person needing to enter a new number may not be aware of which contact numbers can be safely deleted.

In addition, there are instances where the same documents will frequently be sent to a fixed group of destinations. For instance a facsimile machine located at a home office may routinely be used to send identical information to a number of branch offices.

Some facsimile machines now provide soft keys—a display of some sort (such as a touch screen) where information is displayed and a user can make a selection by touching the appropriate area of the display. These selections, however, while programmable as to content at the facsimile machine, are fixed as to appearance. Thus, for example, the soft keys are permanently labeled A–Z or 1–40. A printed list is typically associated with the facsimile machine to allow users to know what number each key represents. This list may suffer from lack of proper updating. Also, it is easy for a user viewing this list to accidentally select the wrong number for his or her transmission. Selecting the wrong number is not only expensive in terms of unnecessary telephone connect charges, but also can lead to situations that are at best embarrassing or at worst disastrous where one party is sent a document that is intended for another party entirely.

Where users can access the facsimile services from a remote workstation, the problems become exacerbated. Each user must then be provided with a copy of the list correlating recipients to soft keys and updates are required for all users whenever a soft key's content is changed. This, as can be imagined, can present severe administrative problems.

In addition, even when selections are programmable only at the facsimile machine, further problems may arise. Programming, especially by someone who is a novice at the operation, may take considerable amounts of time. The programming party, standing at the facsimile machine, will block access to the facsimile machine and, if an MFP, the other functions such as printing and copying that may be needed by others. Furthermore, the programmer will generally have needed information (such as members to be associated with a given group) located at his or her workstation, and thus will have to remember to bring all the necessary information to the facsimile machine. If information is forgotten, additional delays may result while the programmer returns to his or her workstation to retrieve the needed information.

SUMMARY OF THE INVENTION

The invention provides for sophisticated user interface capabilities of a multifunction peripheral. In accordance with the invention, users may create and maintain a multifunction peripheral's user interface definitions—data to be displayed and input handling. The users may use network workstation for creating and editing the user interface definitions, and the user interface definitions are transferred from their workstations to the multifunction peripheral.

The users may also create and edit several types of address books—public address books, workstation address books and shared workstation address books. These address books store names and fax numbers of potential recipients of faxes of the users of the network. Through control of various users' rights to the address books, multiple types of address books may be created on a user-by-user basis.

Within the user interface definitions, users may associate address book entries to soft one-touch keys. The soft one-touch keys are linked to entries in address books, so that, when pressed the soft one-touch key serves as a speed dial for the fax recipient of the address book entry. The associations of soft one-touch keys to address book entries is made on a user or user-group basis. Once a user has identified himself to the multifunction peripheral, user interface definitions for which that user has access rights will be made available to the user.

Still further objects and advantages attaching to the device and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

The system and method of the invention preferably utilize a hardware environment, address books and user interface definitions as described below. After the description of the hardware environment, user interface definitions and the address books, there follows a description of how these components are utilized to provide soft one-touch keys for a multifunction peripheral in accordance with the invention.

Hardware Environment

Figure 1:
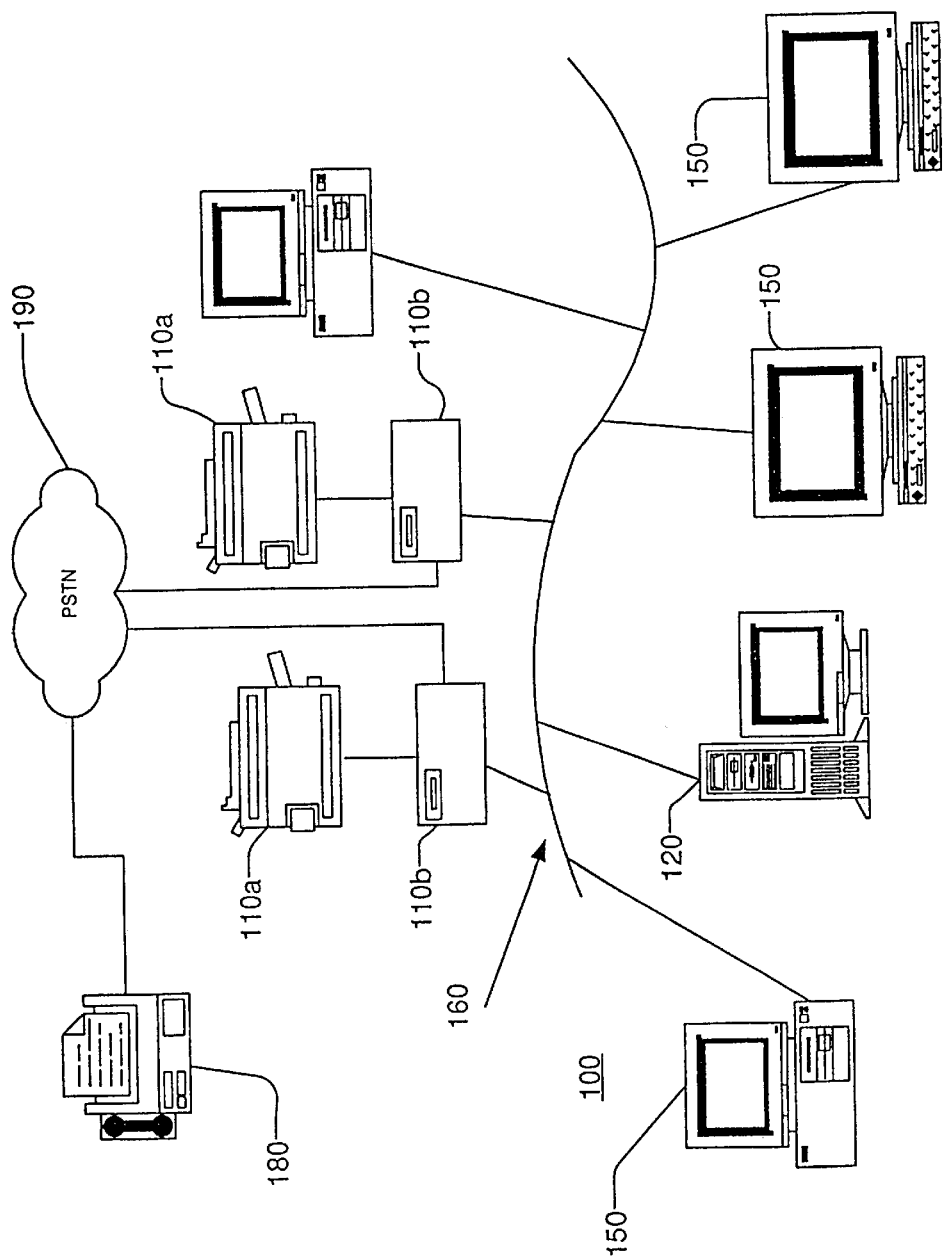
FIG. 1 is a block diagram of a LAN including plural MFPs in accordance with the invention and also having a shared facsimile function and different levels of address books.

Referring now to FIG. 1, there is shown a block diagram of a LAN 100 in accordance with the invention. The LAN 100 includes a file server 120, workstations 150, zand MFP systems 110 coupled to one another via network communications lines 160. The file server 120 and workstations 150 are preferably those well known in the art, such as computers having Intel Corporation (Santa Clara, Calif.) microprocessors and running Microsoft Corporation (Redmond, Wash.) Windows operating systems. The MFP systems 110 preferably comprise a multifunction peripheral 110a and a Host 100b. The LAN 100 may also include hubs, routers and other devices (not shown).

Before proceeding further, a few terms are defined. By "file server," it is meant a computer which controls access to file and disk resources on a network, and provides security and synchronization on the network through a network operating system. By "server," it is meant hardware or software which provides services to other hardware or software. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, and typically provides printing and at least one of: copying, scanning and faxing. The term "facsimile machine" is used herein representatively of devices such as the multifunction peripheral/host combination which provide facsimile transmission services. By "screen" it is meant a computer display device or that which is visible on a computer display device at a given instant in time. By "dialog" it is meant an interactive display unit on a screen; the dialog may be viewable on a portion of a screen, an entire screen, or multiple screens.

Figure 2:
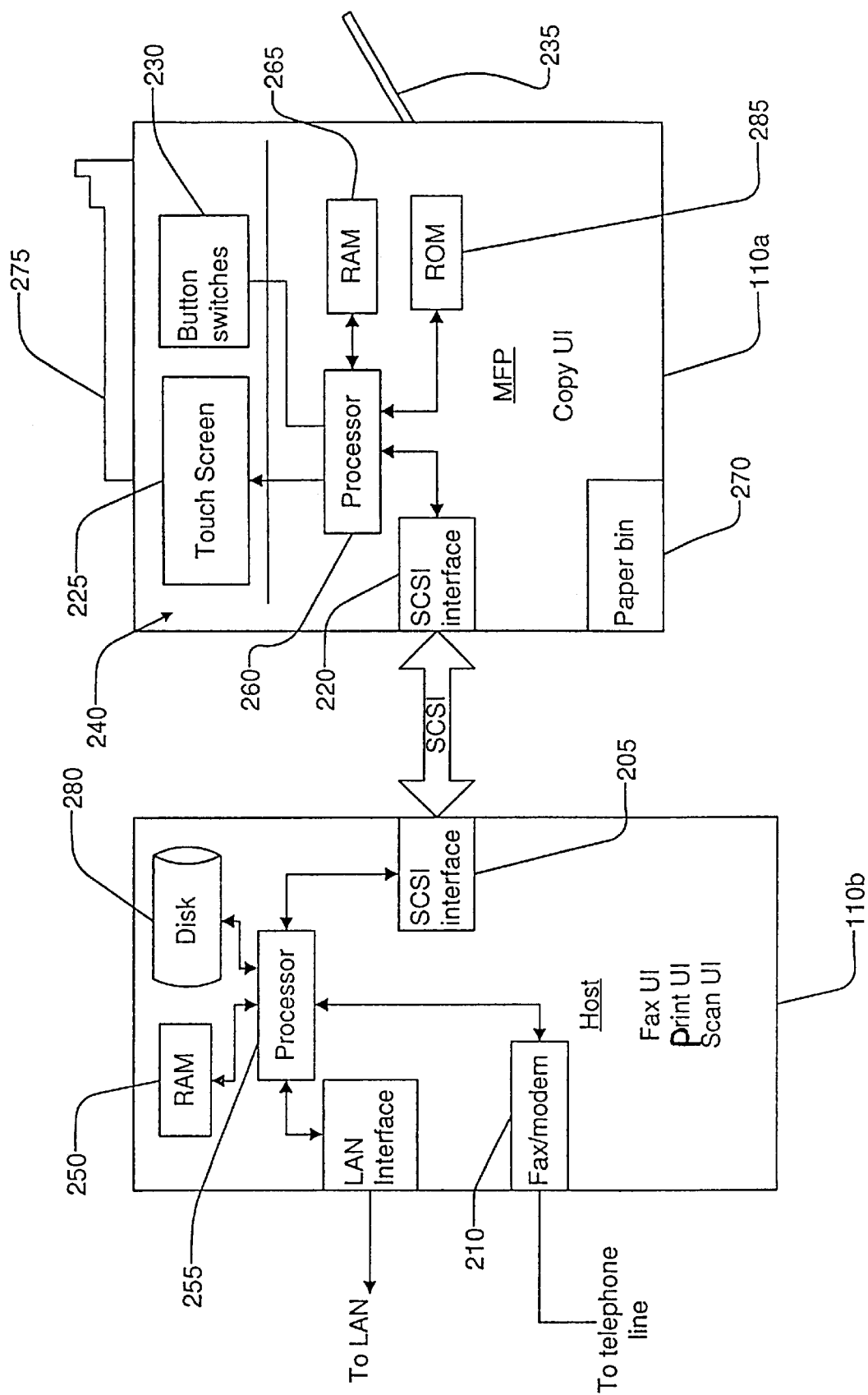
FIG. 2 is a block diagram of a data processing system including a Host and an MFP.

Turning now to FIG. 2, there is shown a block diagram of the multifunction peripheral 110a and the Host 110b. The Host 100b has no display, no mouse and no keyboard. The multifunction peripheral 100a preferably comprises a high output copier having a communications interface 220 (preferably SCSI) and a hardware and software interface which allows the multifunction peripheral 110a to receive rasterized print jobs from the Host 110b, manage the print jobs as well as its own copy jobs, and print the print jobs. The hardware includes a short term memory 265 (preferably RAM) and processor 260 in which programs are stored and run, respectively, for controlling the functions of the multifunction peripheral 110a. The multifunction peripheral 110a preferably also includes a long term memory 285 such as a ROM or EPROM. The multifunction peripheral 110a may also include a disk drive (not shown) for both long term and short term storage. The multifunction peripheral 110a includes standard components including automatic document feeder 275, paper bin 270 and paper output tray 235.

The multifunction peripheral 110a includes a non-fixed display 225, which is preferably a touch screen. A user input device 230 preferably includes a number of mechanical or electromechanical keys labeled "Start," "Cancer" and with the numbers 0 through 9. The multifunction peripheral 110a has user interface software stored in the memory 285 which is responsible for displaying information on the display 225 and interpreting user inputs from the user input device 230 as well as from network workstations 150. The non-fixed display 225 and additional user input device 230 comprise an operator console 240, which together with the user interface software comprise a UI subsystem.

The Host 110b preferably comprises a server having a processor 255 preferably running Microsoft Windows NT. Preferably, there is a one-to-one correspondence between the Hosts 110b and multifunction peripherals 100a. In conjunction with the processor 255, the Host 110b has a short term memory 250 (preferably RAM) and a long term memory 280 (preferably a hard disk) as known in the art. The Host 110b further includes a communications interface 205 through which the Host 110b communicates with the multifunction peripheral 110a. Preferably, the communications interface 205 is configured as a SCSI host. The Host 110b further preferably includes a fax/modem 210 for sending and receiving faxes via telephone lines. The Host 110b includes management software stored in the long term memory 280 for managing printjobs, fax jobs and scanjobs. The Host 110b rasterizes print jobs from the LAN 100 into print data (a form native to the multifunction peripheral 110a) and transmits the print data to the multifunction peripheral 110a via the SCSI interface 205.

FIG. 1 also shows the public switched telephone network 190, to which the Hosts 110b and a standard facsimile machine 180 are coupled. Faxes may be sent between the Hosts 110b and the facsimile machine 180 via the public switched telephone network 190.

The User Interface of the Multifunction Peripheral

Rather than hard-coding the particular information to be displayed and the interpretation of user inputs, this information is preferably stored separately from the user interface software as "user interface definitions." By "user interface," it is meant hardware and software that allow a user to interact with and perform operations.

The UI definitions preferably comprise a number of tables, with each table relating to a different function needing a user interface. Preferably, for displays, the tables include icons, messages, input-fields, rectangles, and pictures. Preferably, for user inputs, the tables include button switch mapping and subroutine identification. For example, for an icon, the UI definition includes an identifier, attributes, normal image, reverse image, normal size, reverse size. The attributes for an icon might include priority, whether the icon represents a "button" on the LCD, controls associated with the icon being selected, position, width, height, etc. For an input field, the UI definition includes an identifier, position, size, cursor position, alignment, font, attribute (off, normal, reverse, blink), start and end position of reverse area, default string, mode, minimum and maximum values, handling of illegal input, maximum string length, background color, cursor type, input method, increment/decrement method, increment/decrement quantities and control of increment/decrement. For a rectangle, the UI definition includes an identifier, position, width, height, line type, line thickness and color. For a message, the UI definition includes an identifier, a message string, font, length and position. For a picture, the UI definition includes identifiers of the other elements which together form the picture, plus an identifier and background color.

The multifunction peripheral 110a stores user interface definitions for copying in the long term memory 285. The multifunction peripheral 110a receives the user interface definitions for printing and faxing from the Host 110b and stores these in the short term memory 265. Preferably, to enhance processing speed and programming ease, the multifunction peripheral 110a also loads the copy UI definitions from the multifunction peripheral's long term memory 285 to the short term memory 265.

Figure 3:
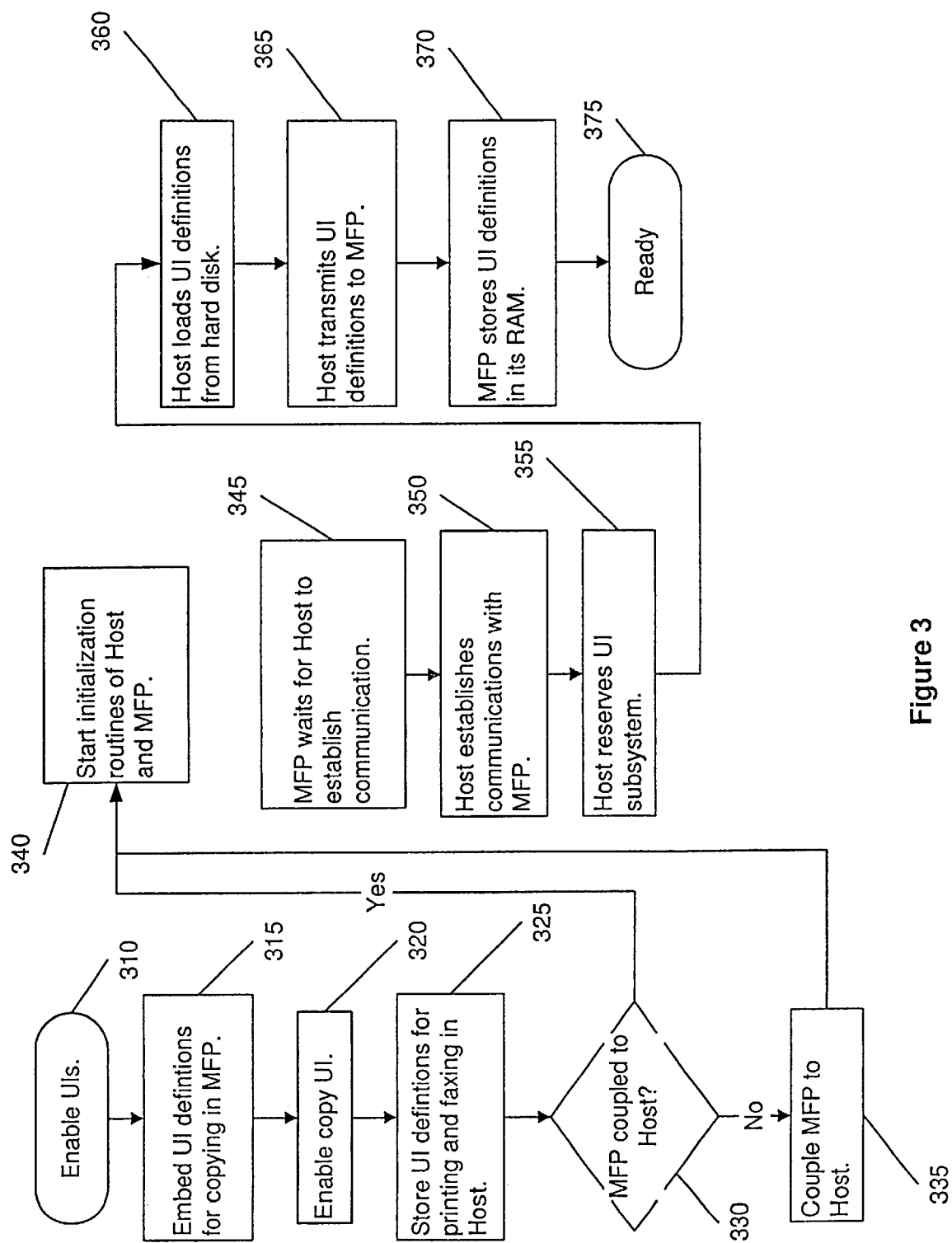
FIG. 3 is a flow chart of a method of user interface creation in accordance with the invention.

With reference to FIG. 3, the method of enabling UIs is described. In a first step, the process begins (step 310). Although shown as part of the process, the next several steps are better considered as preparatory steps. In the first preparatory step, UI definitions for copying are embedded in the multifunction peripheral 110a (step 315). With the copy UI definitions in the multifunction peripheral 110a, the copy UI may be enabled (step 320). These steps 315, 320 normally are performed during manufacturing of the multifunction peripheral 110a. However, the copy UI definitions preferably may be field upgraded.

In the next preparatory step (step 325) the UI definitions for printing and faxing are stored in the Host 110b. If the multifunction peripheral 110a is not coupled to the Host 110b. (step 330), then the multifunction peripheral 110a is coupled to the Host 110b (step 335). This concludes the preparatory portion of the UI enablement process.

Once the UI definitions are stored respectively in the multifunction peripheral 110a and Host 110b, the UI definitions from the Host 110b may be loaded to the multifunction peripheral 110a as part of the MFP's initialization process. This is shown also in FIG. 3. However, it may also be desirable to force the UI definitions to be reloaded from the Host 110b to the multifunction peripheral 110a. Nonetheless, this normally may be done by reinitialization as described below.

Preferably, the multifunction peripheral 110a and Host 110b may be coupled when both are powered on and ready, and the SCSI protocol permits such a hot connection. The software in the multifunction peripheral 110a and Host 110b preferably can sense their connection and automatically transmit the print UI and fax UI from the Host 110b to the multifunction peripheral 110a.

In step 340, initialization routines in the multifunction peripheral 110a and the Host 110b are started. Such routines may address normal system maintenance, but also trigger UI definition loading in accordance with the invention. In step 345, the multifunction peripheral 110a begins waiting for the Host 110b to establish communication through the communications interfaces 205, 220. Next, the Host 110b establishes communications with the multifunction peripheral 110a (step 350). Preferably, this is done in accordance with the SCSI standard. Alternatively, the multifunction peripheral 110a could establish communications with the Host 110a. Furthermore, the multifunction peripheral 110a and Host 110b include timers such that after waiting a predetermined period of time, an error is presumed and reported.

In step 355, the Host 110b reserves the UI subsystem. By reserving the UI subsystem, the Host 110b will control what is displayed on the display 225 and how key selections on the user input 233 are handled.

In step 360, the Host 110b loads the relevant UI definitions from its long term memory 280 to its short term memory 250. The UI definitions may be loaded in parts less than the whole. This step 360 is primarily to permit access to the UI definitions and may be achieved through alternative means as known in the art. Next, the Host 110b transmits the UI definitions to the multifunction peripheral 110a (step 365). Finally, the multifunction peripheral 110a stores the transmitted UI definitions into its short term memory 265 (step 370). This concludes the UI enablement process (step 375).

In normal operation, when the multifunction peripheral 110a needs a UI definition for printing, faxing or another function other than copying, these definitions are accessed from memory 265 in a manner similar to accessing the definitions for the copy UI.

Address Books

In networks such as that shown in FIG. 1, there is typically provided varying levels of security for the users, with at least one user having administration authority. This administration authority may be distributed, such that a high level of access may be granted to particular users for selected applications or purposes.

A number of address books are provided in accordance with the invention. As used herein, an "address book" is a collection of information about people to whom documents may be sent. Address books are useful for inserting address into documents which will be mailed, for inserting recipient information into an envelope, and for selecting fax recipients. Preferably, an address book is comprised of four relational databases: Person, Group, Company, and Phone No. Each database may also be referred to herein as a table, and each table is made up of records. Each record is comprised of a number of fields. One way of structuring these databases is shown in Tables I–IV, below.

TABLE I

Person table

| INFORMATION IN FIELD | TYPE OF CHARACTERS | FIELD SIZE |
| --- | --- | --- |
| Last Name* | Alpha | 24 |
| First Name* | Alpha | 20 |
| Middle Initial* | Alpha | 2 |
| Formal | Enum | 1 |
| Address_1 | Alphanumeric | 40 |
| Address_2 | Alphanumeric | 40 |
| City | Alphanumeric | 26 |
| State | Alphanumeric | 8 |
| Zip Code | Numeric | 14 |
| County | Alpha | 20 |
| Province | Alpha | 20 |
| Country | Alpha | 12 |
| Job Title | Alphanumeric | 26 |
| Department | Alphanumeric | 26 |
| Comment | Alphanumeric | 80 |
| Create Date‡ | Date | Date |
| Create Time‡ | Time | Time |
| Modify Date‡ | Date | Date |
| Modify Time‡ | Time | Time |
| Person Key‡ | Unique key | |
| Company Key‡ | Company Table link | |

*indicates a field that is used to create a key field
‡indicates an item that is system defined

TABLE II

Group table

| INFORMATION IN FIELD | TYPE OF CHARACTERS | FIELD SIZE |
| --- | --- | --- |
| Name | Alphanumeric | 40 |
| Create Date‡ | Date | Date |
| Modify Date‡ | Date | Date |
| Modify Time‡ | Time | Time |
| Phone no. Key‡ | Unique key | |

‡indicates an item that is system defined

TABLE III

Company Table

| INFORMATION IN FIELD | TYPE OF CHARACTERS | FIELD SIZE |
| --- | --- | --- |
| Name* | Alphanumeric | 40 |
| Address_1 | Alphanumeric | 40 |
| Address_2 | Alphanumeric | 40 |
| City | Alphanumeric | 26 |

TABLE III-continued

Company Table

| INFORMATION IN FIELD | TYPE OF CHARACTERS | FIELD SIZE |
|---|---|---|
| State | Alphanumeric | 8 |
| Zip Code | Numeric | 14 |
| County | Alpha | 20 |
| Province | Alpha | 20 |
| Country | Alpha | 12 |
| Country | Alpha | 12 |
| Create Date‡ | Date | Date |
| Create Time‡ | Time | Time |
| Modify Date‡ | Date | Date |
| Modify Time‡ | Time | Time |
| Company Key‡ | Unique key | |

*indicates a field that is used to create a key field
‡indicates an item that is system defined

TABLE IV

Phone Number Table

| INFORMATION IN FIELD | TYPE OF CHARACTERS | FIELD SIZE |
|---|---|---|
| Phone Country Code | Numeric* | 4 |
| Phone Area Code | Numeric* | 5 |
| Phone Local Number | Numeric* | 10 |
| Phone Extension | Numeric* | 6 |
| Phone Type | Enum | 1 |
| Description | Alpha | 40 |
| Create Date‡ | Date | Date |
| Create Time‡ | Time | Time |
| Modify Date‡ | Date | Date |
| Modify Time‡ | Time | Time |
| Phone No. Key‡ | Unique key | |

*indicates a field that is used to create a key field
‡indicates an item that is system defined In accordance with the invention, there are three types of address books: public address books (PAB), workstation address books (WAB) and shared workstation address books (SWAB). Preferably there is a single PAB per workgroup, a single WAB per user, and a single SWAB per user. Setup or utility software preferably includes security means and is run by a network administrator who creates at least the PAB, as well as defines access rights for other users.

Figure 4:
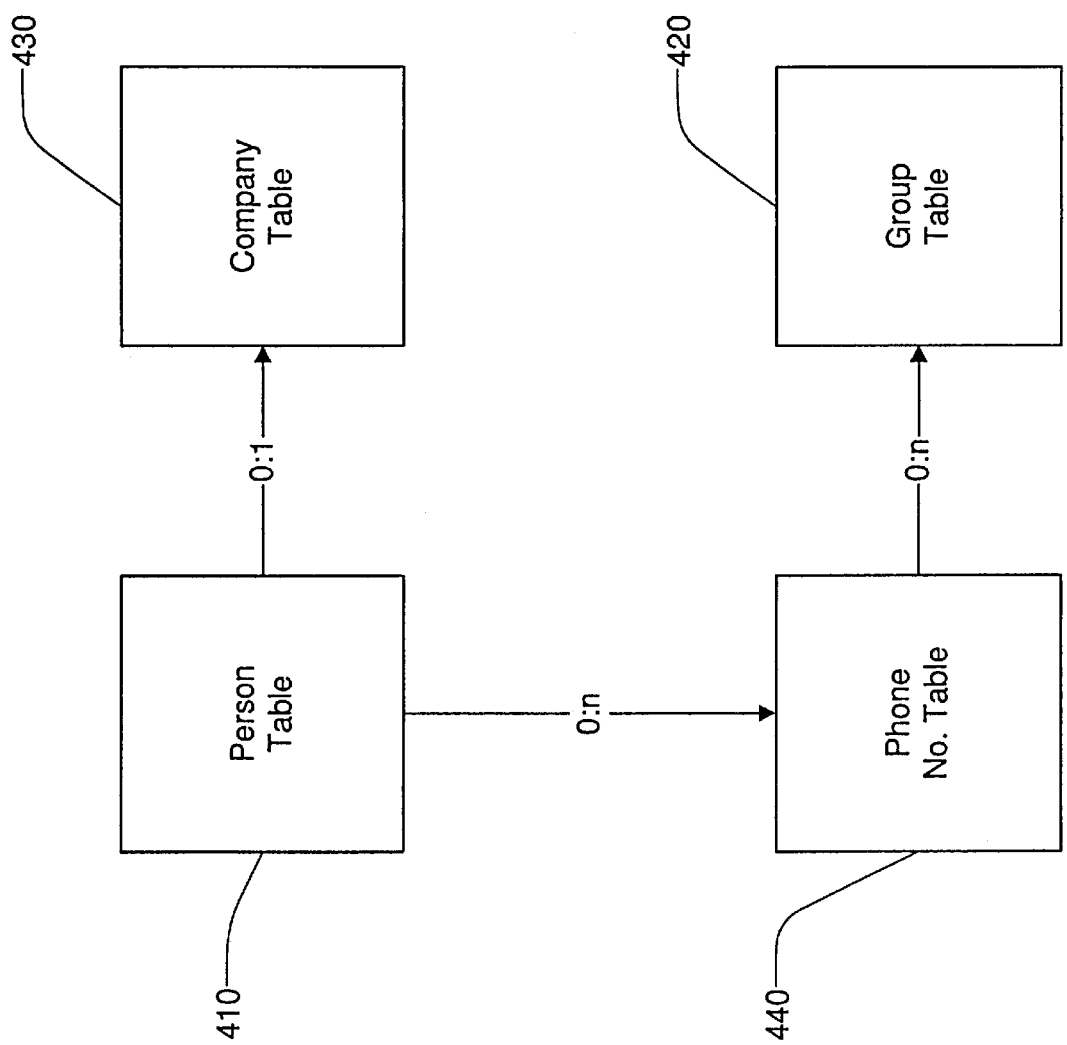
FIG. 4 is a depiction of the relationship of various informational tables used to produce address books in accordance with the invention.

FIG. 4 depicts how the four tables relate to form an address book. Each address book (PAB, SWAB, and WAB) uses the same four table formats. In addition, there is preferably also a User table which includes such information as a user identifier, privileges (user or administrator), and PAB, SWAB and WAB locations. A record in the Person table 410 may relate to up to one record in the Company table 430. A record in the Person table 410 may relate to any number of records in the Phone No. table 440. A record in the Phone No. Table 440 may relate to any number of records in the Group Table 420.

Preferably the address books are in a standard database format, such as dBase IV format, and are accessed via CodeBase. There is preferably provided an editor utility which allows adding, deleting and modifying records in the tables which make up an address book. Preferably, too, one of the file servers in the network is selected by the administrator as an address book server. The administrator may elect to replicate this PAB to another server so that all clients can have access to the PAB, but in that case care must be taken to keep both copies fully updated. The address book server serves at least the PAB and SWABs, and could also serve the WABs.

There are a set of rules that determine how the table records shall be added, deleted, or modified and also how the table records relate to one another. For the Person table, the following rules preferably apply:

Each entry in the Person table is unique. Each record in a Person table has a unique Person Key value.

Unique entry in the Person table is determined by the combination of Last Name, First Name, and Middle Initial.

A Person can have 0 or more Phone Nos.

A Person can belong to 0 or one Company.

For the Group table the following rules preferably apply:

A unique entry in the Group table is determined by the combination of the Group Name and the Phone No. Key.

Each record in the Group table must have a Phone No. Key which associates that group record with an entry in the Phone No. table.

For the Company table the following rules preferably apply:

A unique entry in the Company table is the Company Name, hence, requiring a unique Company Key.

Each record in the Company table must have a unique Company Key which is used to link multiple Persons to a given Company.

For the Phone No. table the following rules preferably apply:

A unique entry in the Phone No. table is determined by the combination of the Phone No. (Country+Area+Local+Extension) and the Person Key.

Each record in the Phone No. table must have a Person Key which associates that phone number record with an entry in the Person table.

In addition, for all the tables, each record in each table is preferably marked Public or Private.

The PAB, preferably stored in file server 120, is visible to all users as read-only data. Only an administrator has privileges to create, modify and delete information in the PAB. The PAB is accessible from any user station on the network 100. To allow a walk-up user of the MFP 110a to send facsimile transmissions directly from the MFP 110a, the PAB is preferably also accessible from the control panel 240 of the MFP 110a.

Each WAB is a private address book maintained on a per-user basis in association with each workstation 150. This information can be transferred to the network server 120. Each user has read/write privileges over the data in his or her workstation 150 as long as it remains in his or her private workstation.

The SWAB is a collection of private address books. SWAB information is created by transferring a WAB to the network server 120. While the administrator preferably defines the location for the SWABs on the server 120, the users upload their own WAB data into their SWABs.

In order to maximize flexibility, accuracy, and privacy with respect to address book information, a set of useful rules are applied to the use of the various address books (PAB, WAB, and SWAB):

There is only one PAB, and the location of this PAB is determined by an administrator.

There is only one SWAB per user and the location of this SWAB is determined by an administrator.

The Host 110b, the administrator, and client users must have read access to the server 120 that stores the PAB and the SWAB.

Users maintain their own address books in their own WAB on their local drive. This allows the users to walk away with their address books intact on their laptop, and allows them to have access to their private address book entries if the network is down.

Users can optionally upload from their WAB into their SWAB so that the WAB data can be accessed from the MFP's control panel 240 (walk-up usage).

Users cannot share address lists and address entries that are marked as private—only the user that created the private list and/or private entries can read, modify, or delete them.

It can be seen that there is an increase in efficiency and reliability in this system as the use of storage is minimized, recipient information is kept current and consistent throughout the organization, and information keying is minimized.

Soft One-Touch Keys: Linkage Between the UIs and the Address Books

The following description concerns how the user interface definitions and address books are used in the facsimile machine of the invention to provide an enhanced user interface. In one aspect, users may assign labels and phone numbers to soft one-touch keys which are displayed and selected from the facsimile machine's panel. In another aspect of the invention, users are given access from the facsimile machine to address books stored in computers in a network. The following description first describes the set up of soft one-touch keys in accordance with the invention, and then describes use of the soft one-touch keys and access to the address books. The description is made with respect to the MFP system 110, which is the preferred embodiment. The user interface described in this section is preferably part of the facsimile UI uploaded from the Host 110b to the MFP 110a. Throughout these processes, with respect to user interfaces, the MFP 110a acts somewhat like a dumb terminal, wherein the operator console 240 is substantially controlled by the Host 110b. The invention may also be embodied in a self-contained facsimile machine.

Figure 5:
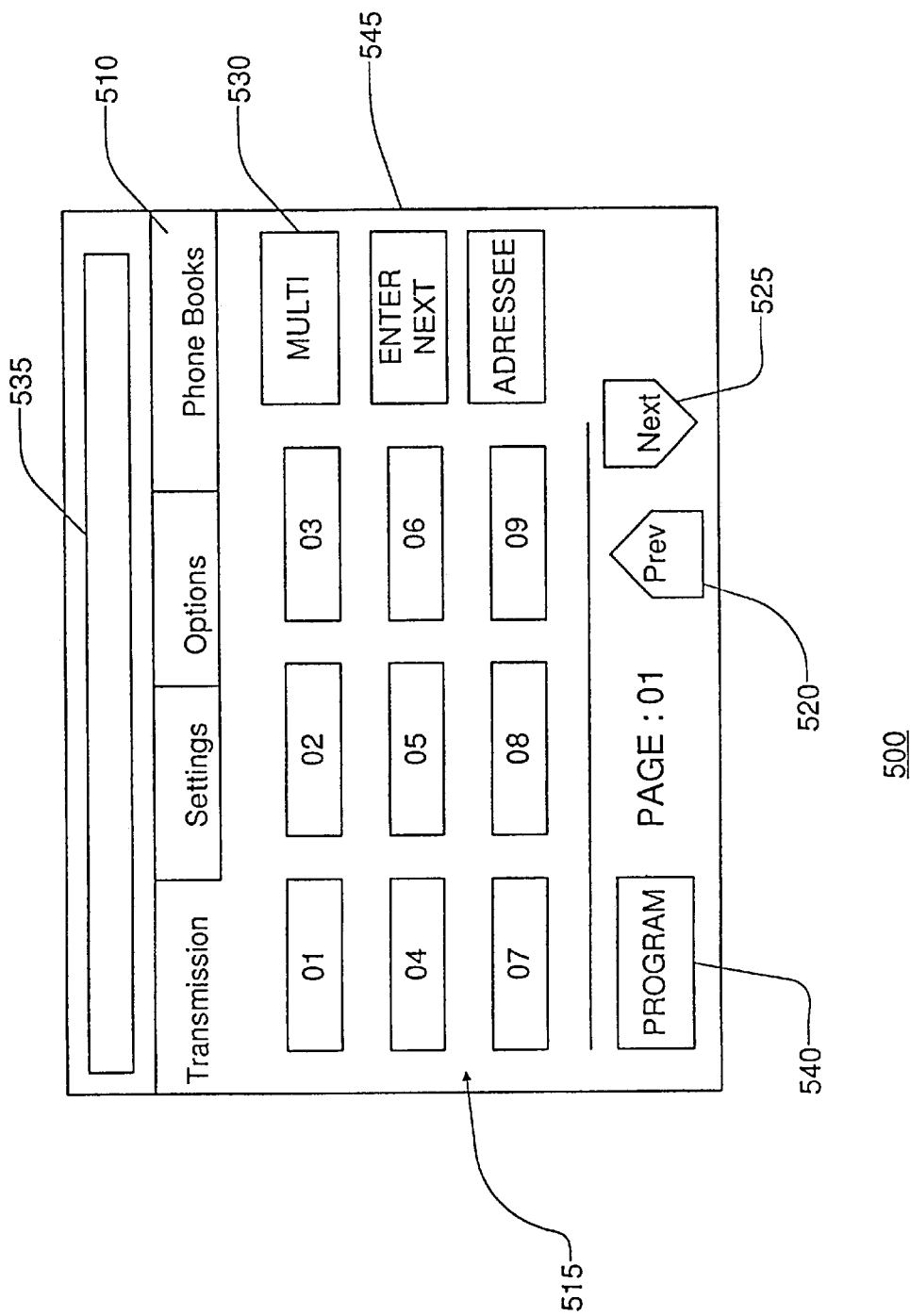
FIG. 5 is a screen shot of a soft one-touch key set up screen in accordance with the invention.
Figure 6:
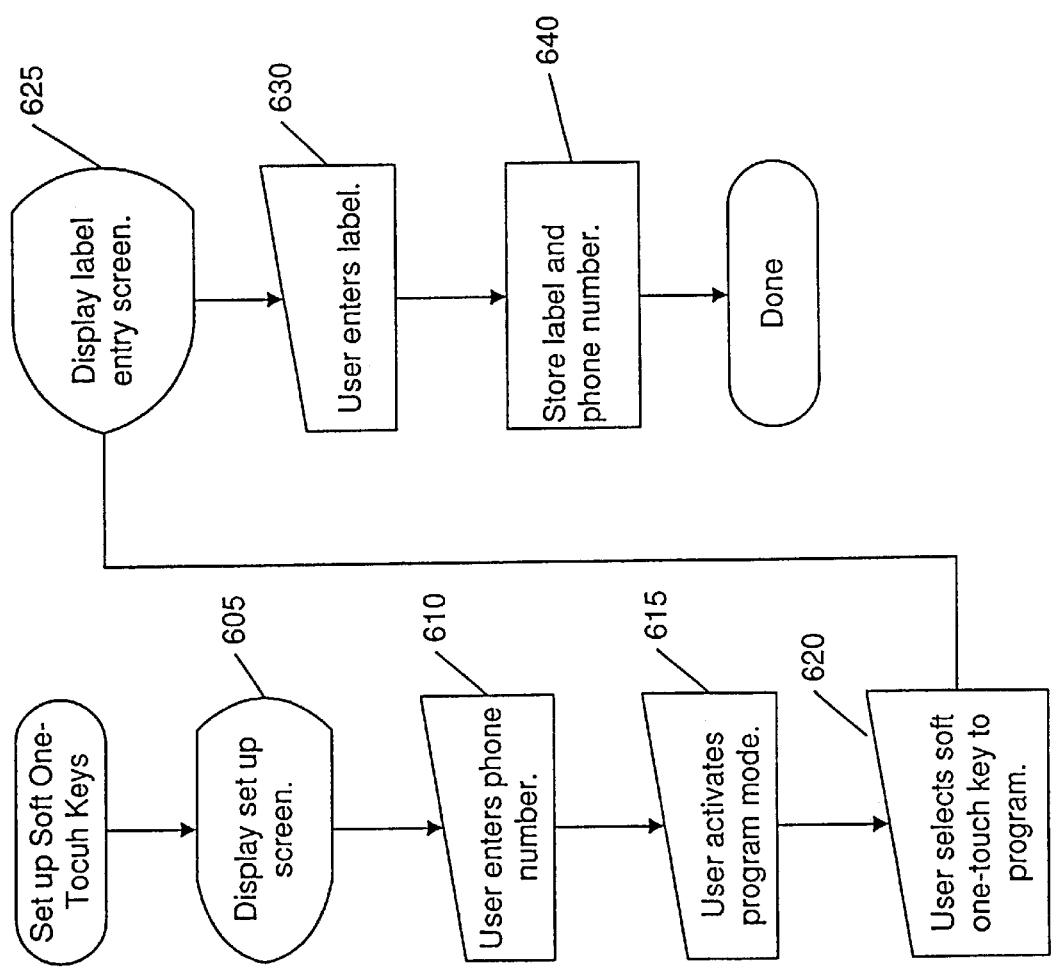
FIG. 6 is a flow chart of a set-up process for soft one-touch keys in accordance with the invention.

Referring now to FIG. 6, in the first step of the use phase, the MFP 110a displays on the display 225 a soft one-touch key set up screen (step 605). FIG. 5 shows an example of a multi-purpose soft one-touch key screen (generally 500), from which a user may both set up and use soft one-touch keys 515. There are preferably plural soft one-touch keys 515 shown on each of eight pages. In FIG. 5, only nine soft one-touch keys 515, numbered 01–09 are shown. Users preferably may scroll through the pages of soft one-touch keys using a previous page key 520 and a next page key 525.

In the disclosed embodiment, the soft one-touch keys are the same for all users. However, it is within the scope of the invention for each user or workgroup to have individualized, protected and confidential soft one-touch key assignments.

In step 610, the user enters a phone number using the fixed number keys of the user input 230. The entered numbers appear in field 535. The user enters the phone number just as if he intended to send a facsimile. In this regard, the user preferably may enter plural phone numbers, for example, by first pressing a multi key 530 to indicate that a list of phone numbers is to be entered. Furthermore, the user preferably may also select entries and groups from available address books as discussed above. After the user enters each phone number, he presses an enter next key 545 to add the new phone number to the list and ready the display for the user's next entry.

In step 615, the user presses a program soft key 540 on the screen 500, which activates a program mode in the MFP 110a. Next, the user selects a soft one-touch key 515 (step 620). The MFP 110a then displays a label entry screen (step 625) and allows the user to designate a label for the selected soft one-touch key 515 (step 630). The MFP 110a preferably displays a soft alphanumeric keypad from which the user may enter the label, and a soft key for the user to press when the user has finished entering the label. The label and the entered phone number(s) are then stored, along with their association to the selected soft one-touch key (step 640).

It can be seen that the process of assigning labels and phone numbers to a soft one-touch key is a database management process, with the labels and phone numbers comprising records in the database. Although the database could be stored in the MFP 110a, it is preferably stored in the Host 110b as part of the facsimile UI definition.

Preferably, the soft one-touch keys 515 have default labels as shown in FIG. 5. Thus, adding labels is preferably an editing process, and user-entered labels may be changed in the same manner as they are first entered.

Although the set-up phase has been described as performed at the MFP 110a, the set-up phase preferably may also be performed at the workstations 150 on the network 100, with the set up information created by a user at a workstation being included in the facsimile UI and uploaded in the manner described above. When displayed on a workstation, MS Windows control and title objects will also be displayed, as these are a function of the workstation operating system and software.

It should also be appreciated that, although FIG. 6 shows a number of process steps in a sequence, the steps may be performed in a different order while still achieving the same results. It is the results which are critical—the storage of phone numbers and labels in association with soft labels of a facsimile machine (the MFP 110a in the example).

Figure 7:
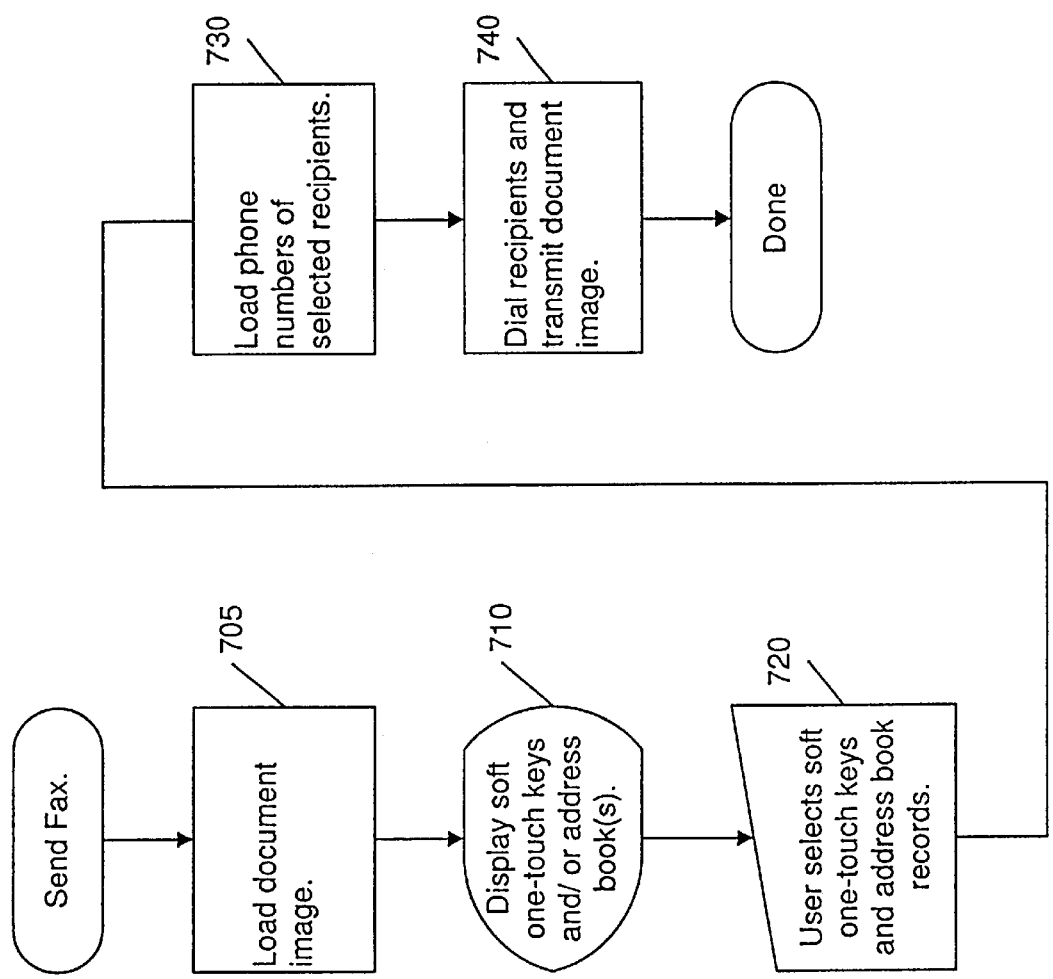
FIG. 7 is a flow chart of a facsimile send process in accordance with the invention.

Turning now to FIG. 7, the process of sending a facsimile using the soft one-touch keys and the address books is described. As with any process of sending a facsimile, an image of the document to be sent must be loaded into the MFP 110a (step 705). Normally, this is done by scanning the image into the short term memory 265 of the MFP 110a from the automatic document feeder 275 and the MFP's scanner. In the preferred embodiment, the image is then transferred to the Host 110b, which will handle the facsimile transmission. The images may be transferred from the MFP 110a to the Host 110b after each page is scanned, or may be transferred when one or more pages of the document have been scanned. Furthermore, the transfer may take place before or after the user has selected recipients.

At some point either before or after the document image was loaded in step 705, the MFP 110a displays a screen showing the available selections—either soft one-touch keys or address book records (step 710). The soft one-touch keys and/or the address book records occupy defined areas of the touch screen, and a user can select them by touching the displayed portion of the soft one-touch keys and/or address book records (step 720).

Returning now to FIG. 5, the user can select a single soft one-touch key by touching it, or a number of soft one-touch keys by first pressing the multi key 530. The user can access the phone books by selecting a phone books tab 510.

Figure 8:
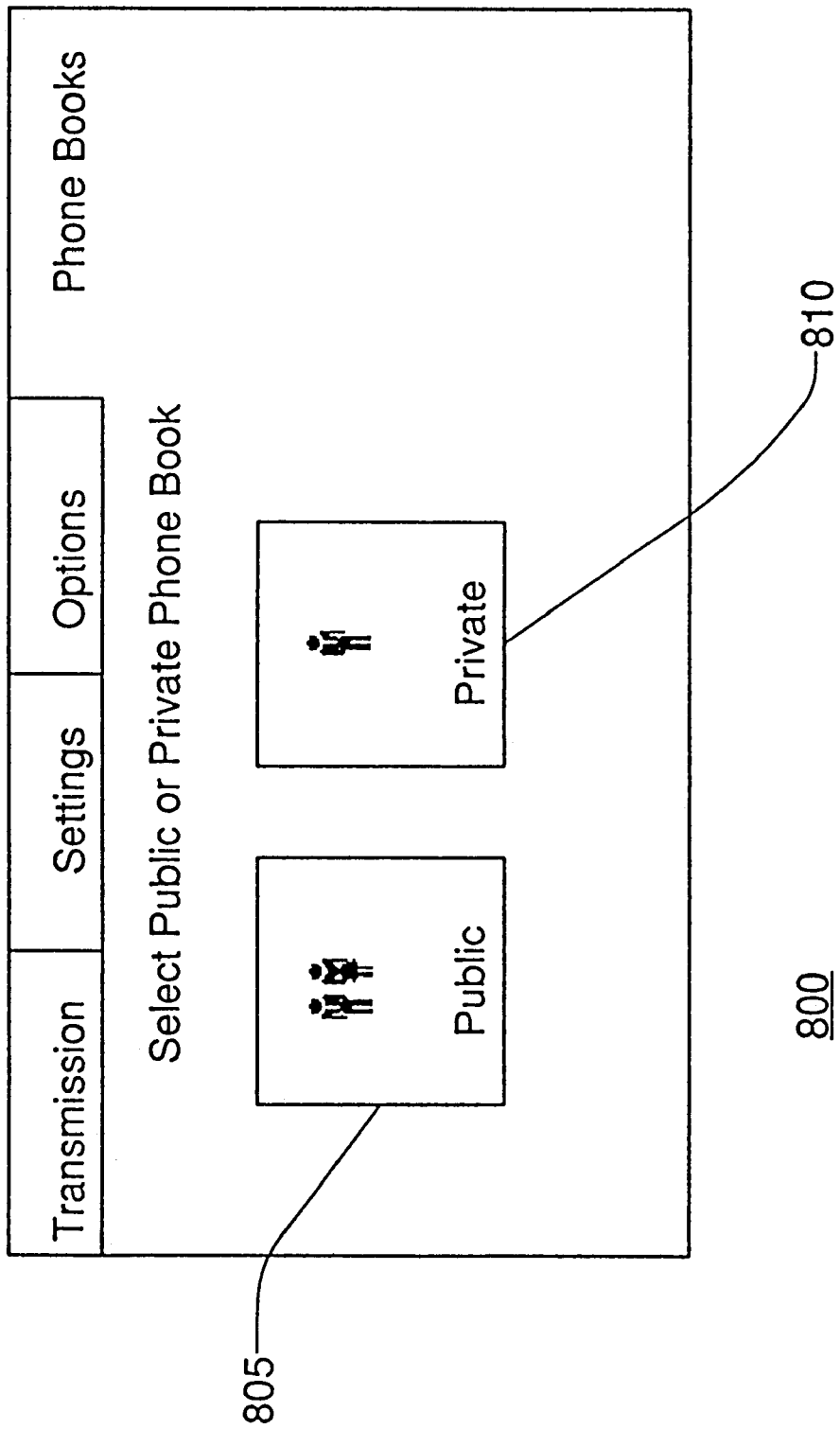
FIG. 8 is a screen shot of a main address/phone book selection dialog.
Figure 9:
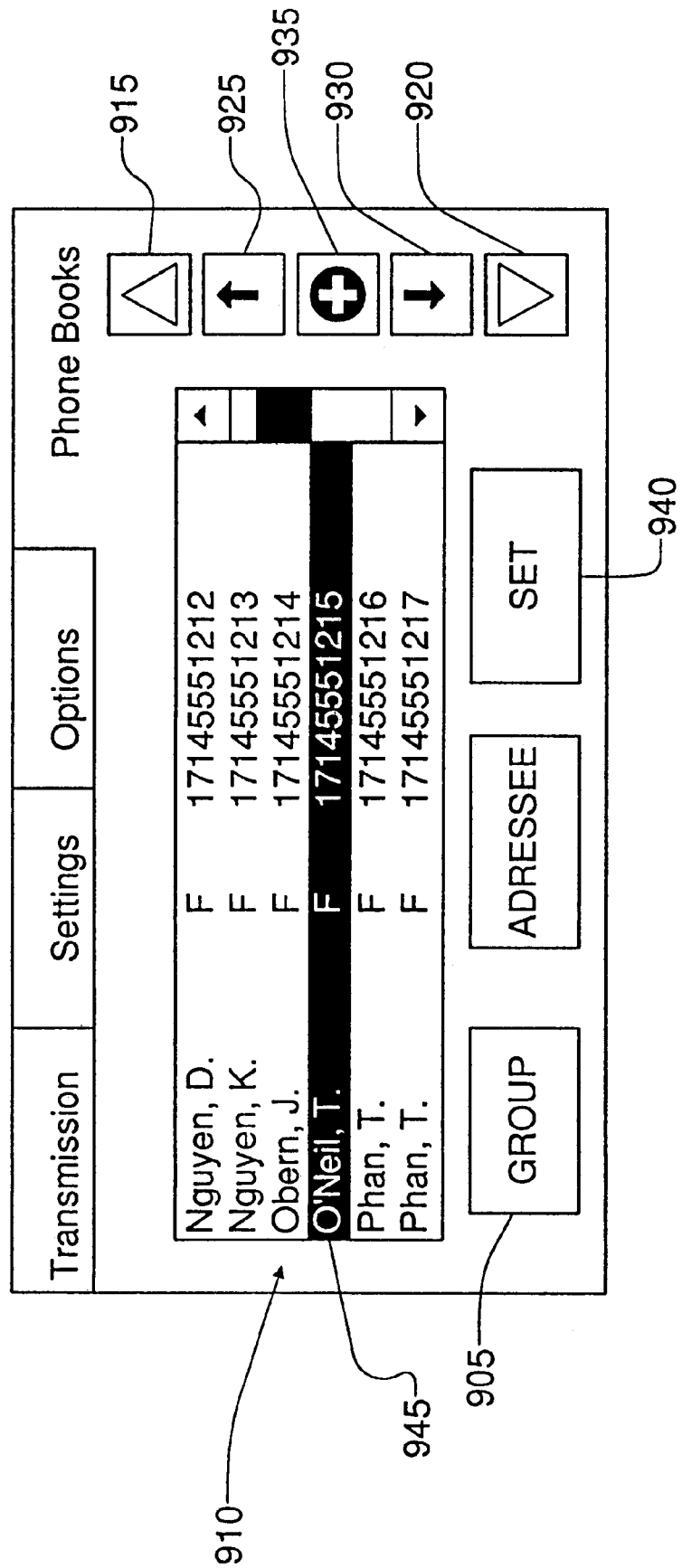
FIG. 9 is a screen shot of a public addressee selection dialog.

FIG. 8 shows a main address book selection dialog, denominated generally as 800. If the user selects a public button 805, then the MFP 110a displays a public address phone book screen 900 as shown in FIG. 9. If the user selects a private button 810 then the MFP 110a displays a private address phone book selection screen as shown in FIG. 10.

The public address book screen 900 shows a number of address book records 910. One of the address book records 945 is shown selected. A plus key 935 is used to add the selected record 945 to a recipient list in memory. If the user presses a set button 940, the MFP 110a accepts the recipient list and begins sending the document image to the recipients in the recipient list.

Navigation aids are provided for scrolling through previous pages 915 and later pages 920 of the displayed address book, as well as for scrolling up 925 and down 930 respectively through the displayed address records 910. Also, if the user presses a group button 905, the MFP 110a displays a similar dialog but showing a list of groups from the Group table, from which the user may select address book groups as recipients in the same manner as described with respect to individuals.

Figure 10:
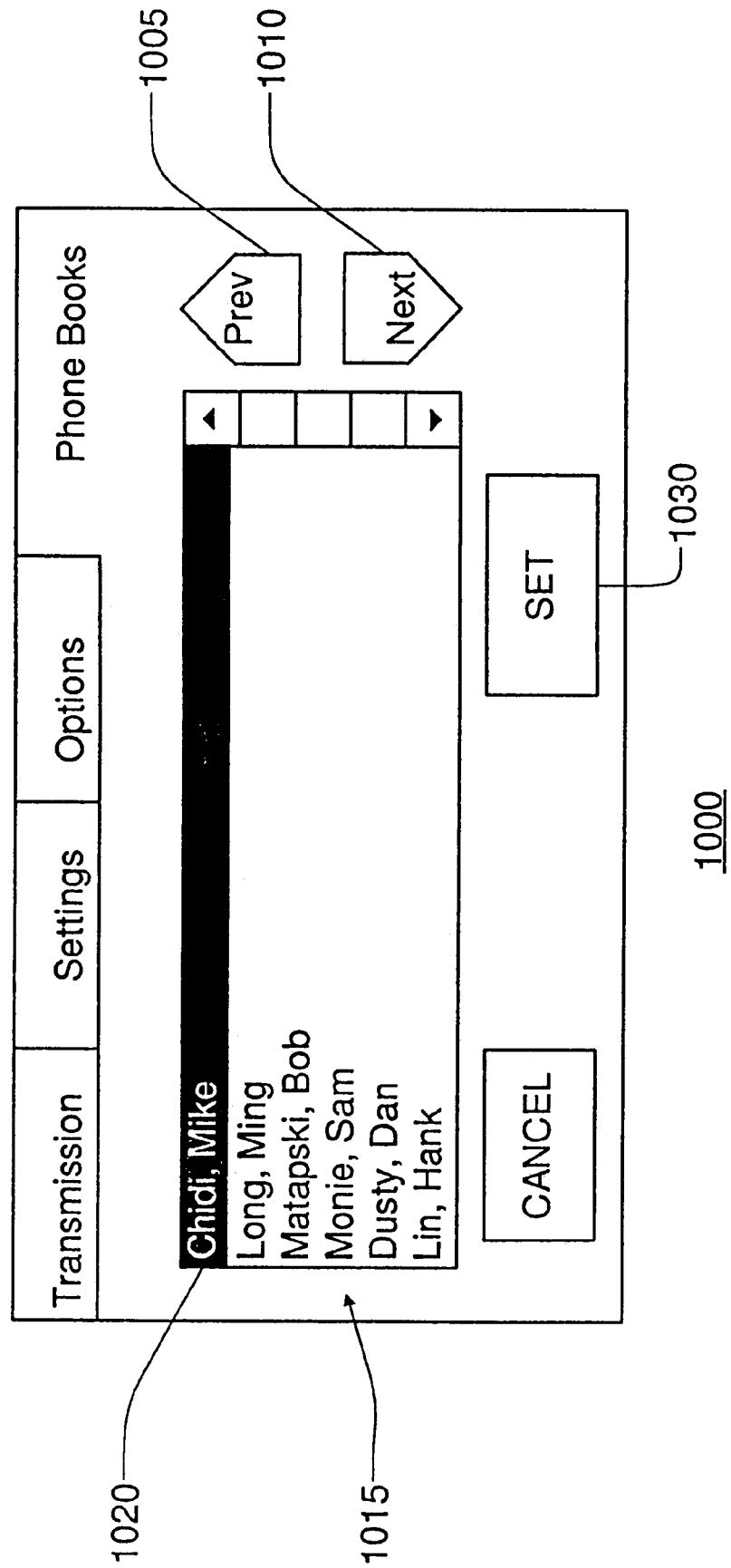
FIG. 10 is a screen shot of a dialog showing a list of private address book owners.

In the private address book selection screen of FIG. 10, shown generally as 1000, there is a list 1015 of all users having private address books. The user selects his or her own private address book by touching the display of his name 1020. The user can page up in the list 1015 using a prev key 1005 or page down using a next key 1010 until the proper page is accessed. The user confirms his choice by pressing the a set key 1030. Next, the MFP 110a preferably asks the user to confirm his identity through entry of a password assigned to the user. After the user correctly enters his password, the MFP 110a displays a dialog similar to that of FIG. 9, except that the records displayed are those in the user's personal address book.

After the user has selected at least one recipient from those displayed on the touch screen (step 720), either via soft one-touch keys or address books, the Host 110b loads the telephone numbers of the selected recipients (step 730). The user preferably indicates that he has completed selecting recipients by pressing the start key on the user interface 230. The Host 110b then dials the telephone numbers, connecting to the recipients' facsimile machines, and transmits the image of the document to the recipients' respective facsimile machines (step 740).

Although exemplary embodiments of the present invention have been shown and described, it will be apparent to those having ordinary skill in the art that a number of changes, modifications, or alterations to the invention as described herein maybe made, none of which depart from the spirit of the present invention. All such changes, modifications and alterations should therefore be seen as within the scope of the present invention.

It is claimed:

1. A method of sending a document by facsimile from a first facsimile-capable machine to at least one recipient facsimile-capable machine, the first facsimile-capable machine comprising a touch screen, a short term memory and a long term memory; the method comprising the steps of:

(a) loading a plurality of facsimile recipient records into a database in the long term memory, each facsimile recipient record including a label and at least one recipient identifier, wherein the label is user-programmable;

(b) the first facsimile-capable machine loading an image of the document into the short term memory;

(c) the first facsimile-capable machine displaying one or more soft one-touch keys, each soft one touch key having an associated facsimile recipient record, wherein the label of the associated facsimile recipient record is displayed in association with the respective soft one-touch key;

(d) selecting at least one recipient by touching the one or more soft one-touch keys;

(e) the first facsimile-capable machine correlating the selected soft one-touch key with a respectively associated facsimile recipient record;

(f) the first facsimile-capable machine loading the at least one recipient identifier of the respectively associated facsimile recipient record, wherein each recipient identifier identifies a recipient facsimile-capable machine;

(g) the first facsimile-capable machine connecting to the at least one recipient facsimile-capable machine; and (h) the first facsimile-capable machine transmitting a scanned image of the document to the at least one recipient facsimile-capable machine.

2. The method according to claim 1, wherein at least one recipient identifier includes telephone number information associated with a recipient facsimile-capable machine.

3. The method according to claim 1, wherein at least one recipient identifier includes a pointer to an address record in an address book, wherein at least one address record includes a telephone number associated with a recipient facsimile-capable machine.

4. The method according to claim 1, wherein the first facsimile-capable machine has a program mode for programming the labels displayed in association with respective soft one-touch keys, wherein said program mode includes the steps of:

the first facsimile-capable machine displaying one or more soft one-touch keys on the touch screen;

selecting one soft one-touch key from those displayed on the touch screen by touching the one soft one-touch key and activating a soft one-touch key program mode;

the first facsimile-capable machine correlating the selected soft one-touch key with the facsimile recipient record associated therewith;

the first facsimile machine providing a user with a data entry space on the touch screen for inputting the label and the at least one recipient identifier of the facsimile recipient record; and the first facsimile machine storing the label and the at least one recipient identifier entered by the user.

5. The method according to claim 4, wherein the first facsimile-capable machine is coupled to a computer network, wherein plural address books are stored in one or more general purpose computers on the network, the method further comprising the steps of:

entering a user identifier into the first facsimile-capable machine; and the first facsimile machine obtaining one or more facsimile recipient records from at least one of the one or more general purpose computers, wherein access to said one or more facsimile recipient records is determined by said user identifier.

6. The method according to claim 5, wherein the one or more general purpose computers store facsimile recipient records in an address book, wherein the label of the facsimile recipient record includes a recipient name.

7. A facsimile-capable machine comprising:

(a) a fax/modem;

(b) a short term memory;

(c) a long term memory;

(d) a touch screen;

(e) a processor coupled to the fax/modem, the short term memory, the long term memory and the touch screen;

(f) a program having instructions for the processor to interact with the fax/modem, the short term memory, the long term memory and the touch screen, the program including instructions for:

(i) loading a plurality of facsimile recipient records into a database in the long term memory, each facsimile recipient record including a label and at least one recipient identifier, wherein the label is user-programmable;

(ii) loading an image of a document into the short term memory;

(iii) displaying one or more soft one-touch keys, each soft one-touch key having an associated facsimile recipient record, wherein the label of the associated facsimile recipient record is displayed in association with the respective soft one-touch key;

(iv) correlating the touch of a soft one-touch key with a respectively associated facsimile recipient record;

(v) loading the at least one recipient identifier of the respectively associated facsimile recipient record, wherein each recipient identifier identifies a recipient facsimile-capable machine;

(vi) connecting to the at least one recipient facsimile-capable machine;

(vii) transmitting a scanned image of the document to the at least one recipient facsimile-capable machine; and (viii) transmitting a scanned image of the document to the recipient's facsimile machine.

8. The facsimile-capable machine of claim 7, wherein at least one recipient identifier includes telephone number information associated with a recipient facsimile-capable machine.

9. The facsimile-capable machine of claim 7, wherein at least one recipient identifier includes a pointer to an address record in an address book, wherein at least one address record includes a telephone number associated with a recipient facsimile-capable machine.

10. The facsimile-capable machine of claim 7 further comprising a soft one-touch key program mode, wherein the first facsimile-capable machine has a program mode for programming the labels displayed in association with respective soft one-touch keys, wherein said program mode includes the steps of:

displaying one or more soft one-touch keys on the touch screen;

activating a soft one-touch key program mode for a one-touch key, in response to selection of the one-touch key by touching the one soft one-touch key;

correlating the selected soft one-touch key with the facsimile recipient record associated therewith;

providing a user with a data entry space on the touch screen for receiving the label and the at least one recipient identifier of the facsimile recipient record; and storing the received label and the at least one recipient identifier.

11. The facsimile-capable machine of claim 7, wherein the facsimile-capable machine is coupled to a computer network, wherein plural address books are stored in one or more general purpose computers on the network, the program further comprising instructions for:

entering a user identifier into the facsimile-capable machine;

obtaining one or more facsimile recipient records from at least one of the one or more general purpose computers on the computer network, wherein access to said one or more facsimile recipient records is determined by said user identifier.

12. The facsimile-capable machine of claim 11, wherein the one or more general purpose computers stores facsimile recipient records in an address book, wherein the label of the facsimile recipient record includes a recipient name.

13. The facsimile-capable machine of claim 7 further comprising:

(a) a malfunction peripheral comprising a paper tray, the touch screen, a first processor, a first memory for long term storage and a second rewritable memory for short term storage, a first communications interface and first user interface software stored in the first memory for controlling the touch screen in accordance with user interface definitions, wherein displays on the touch screen are generated by the processor according to the user interface software; and (b) a host comprising a second processor, a third memory for long term storage and a fourth memory for short term storage, a second communications interface coupled to the first communications interface, the fax/modem, a network adapter for communicating with a computer network, and user interface definitions stored in the third memory for facsimile functions, wherein the host can upload the user interface definitions to the multifunction peripheral unit via the communications interface of the host for user interaction with the multifunction peripheral through the display and user input device for printer functions.

* * * * *